US005738891A

United States Patent [19]

Andreae et al.

[11] Patent Number: 5,738,891
[45] Date of Patent: Apr. 14, 1998

[54] HIGH TEMPERATURE COOKING SAUCE

[75] Inventors: Cornelis Frederik Andreae, Maassluis, Netherlands; Philip Edward Dazo, Pepuanock, N.J.; Gijsbert Kuil, Vlaardingen, Netherlands; Gerardus Anthonius Matthijssen, Abbenbroek, Netherlands; Johannes Frederik Mulder, Vlaardingen, Netherlands

[73] Assignee: Van Den Bergh Foods Company, Division of Conopco, Inc., Lisle, Ill.

[21] Appl. No.: 604,537

[22] Filed: Feb. 21, 1996

[30] Foreign Application Priority Data

Feb. 22, 1995 [EP] European Pat. Off. ............. 95200427
Aug. 14, 1995 [EP] European Pat. Off. ............. 95305658

[51] Int. Cl.$^6$ ............................. A23D 7/00; B65D 85/72
[52] U.S. Cl. ............................................. 426/113; 426/602
[58] Field of Search ........................................ 426/113, 602

[56] References Cited

U.S. PATENT DOCUMENTS 4,861,610  8/1989  Kato et al. .................... 426/602 X

FOREIGN PATENT DOCUMENTS 319 064   6/1989  European Pat. Off. .
414 024   2/1991  European Pat. Off. .
426 211   5/1991  European Pat. Off. .
594 258   4/1994  European Pat. Off. .
1 525 929 9/1978  United Kingdom .

OTHER PUBLICATIONS

Abstract of Japan 62–221,629 (Published Sep. 29, 1987).
EP Search Report (Dated Jul. 19, 1995).
PCT Search Report (Dated Apr. 1, 1996).
Composition for Five Brothers' Alfredo Pasta Sauce (Undated).
Good Housekeeping "New Colour Cookery:", p. 98 (Undated).
"The Complete Guide to the Art of Modern Cookery", A. Escoffier, reprint 1984, p. 22.

Primary Examiner—Leo B. Tentoni
Attorney, Agent, or Firm—Matthew Boxer

[57] ABSTRACT

A sterile, packed food emulsion suitable for fully cooking a host food or adding to cooked food and for imparting a golden brown au gratin coating upon cooking, and including: water; 10-65 wt % edible fat; 0.05-10.00 wt % caseinate; and 0.1-10.0 wt % browning agent, which is chosen from a group consisting of carbohydrates, proteins and mixtures thereof; wherein the emulsion has a pH of at least 5.0 and further includes at least 0.5 ppm lysophospholipoprotein as an emulsifier.

17 Claims, No Drawings

HIGH TEMPERATURE COOKING SAUCE

The present invention is concerned with a cooking emulsion, particularly a sauce which can withstand high cooking temperatures. In particular the sauce is a ready-to-use sauce to be employed for preparing so called au gratin dishes.

STATE OF THE ART

A suitable method for cooking an au gratin dish is covering a host food (e.g. potatoes) with a fresh, cheese-containing sauce, and placing the food in an oven or under a grill until the dish is fully cooked and turns golden brown. Such a cheese-containing sauce is often referred to as a Mornay sauce. See e.g. A. Escoffier, The Complete Guide to the Art of Modern Cookery, reprint 1984, p. 22.

These fresh sauces described for use in au gratin cooking should be used immediately; they cannot be stably stored and will deteriorate when kept for future use in containers. Such sauces are therefore not suited as a basis for a ready-to-use au gratin sauce.

An au gratin sauce has an approximately neutral pH (eg pH 5.5 to 6.0) and should therefore be sterilised. However, home-made au gratin sauces tend to coagulate when subjected to high sterilization temperatures.

The emulsified heat stable sauces known from GB 1525929 and EP 0 426 211 have a pH of 4.4, which is too acidic for an au gratin sauce. Actually these sauces are dressings meant for cold application. Indeed, most sauces for foods have a low pH; they therefore require pasteurisation only.

These known low pH food sauces are not suitable for cooking a raw host food, since they impart an unfavourable sour flavour profile to the host food during cooking. Thus, they are generally added to cooked host foods.

Ready-to-use pasta sauces are not suitable for fully cooking a host food or adding to cooked food and for imparting a golden brown au gratin coating upon cooking, particularly because of their high cream content (eg. 25 wt %). Au gratin sauces do not generally contain cream.

Although a ready-to-use au-gratin sauce would fulfill a consumer need, the only products on the market are dry powders which need further processing and for which additional ingredients, such as milk, are necessary.

STATEMENT OF INVENTION

According to the present invention there is provided a sterile, packed food emulsion suitable for fully cooking a host food or adding to cooked food and for imparting a golden brown au gratin coating upon cooking, and comprising:
  water;
  from 10 to 65 wt % edible fat;
  from 0.05 to 10.00 wt % caseinate; and
  from 0.1 to 10.0 wt % browning agent, which is chosen from a group consisting of carbohydrates, proteins and mixtures thereof; wherein the emulsion has a pH of at least 5.0 and further comprises at least 0.5 ppm lysophospholipoprotein as an emulsifier, and the emulsion does not contain 20–100 wt % cream.

Preferably, the caseinate is cheese caseinate, and the proteins of the browning agent do not comprise cheese caseinates.

The emulsion may comprise 20–40 wt % edible fat, preferably 20–35 wt % edible fat. It may also comprise 0.1–5.0 wt % browning agent.

In one embodiment, the ready-to-use food emulsion is used as a topping sauce for fully cooking a host food for the preparation of au gratin dishes and preferably comprises the following ingredients
  5–80 wt %, preferably 10–65 wt %, of edible fat
  0.05–10 wt %, preferably 2–5 wt % of caseinate
  0.1–5 wt %, preferably 2–5 wt %, of dairy protein not being caseinate (eg. milk powder)
  water making the balance,
which has a pH of at least 5.5 and which is further characterised in that it contains at least 0.5 ppm lysophospholipoprotein as a stabilizer.

The invention further provides food covered with the sauce of the invention and processes for preparation of the sauce and of au gratin dishes employing the sauce.

DETAILS OF THE INVENTION

The sauce is prepared preferably with vegetable fat, e.g. soybean oil or sunflower oil. Preferably 10–65 wt. % of vegetable oil is used, more preferably 20–35 wt. %. The caseinate is suitably added as cheese, e.g. 0.05–10.00 wt. %, of comminuted Parmesan, Gouda, Swiss, Cheddar, Emmental, Non-Melting Salt (NMS) cheese or any other caseinate-containing natural or substitute cheese product. The browning agent is added in the form of, for example, sugars (preferably lactose), whey protein or skimmed milk powder (which contains lactose and milk protein). A preferred browning agent is 0.1–5.0 wt % skimmed milk powder. The sauce may also contain 1–3% modified corn starch, particularly if it is to cook a host food.

NMS cheese is a cheese which melts and does not contain emulsifying salts such as di- or trisodium phosphate. NMS cheese is composed of various cheese, a proportion being ultra filtrated (UF cheese). Preferably, NMS cheese includes parmesan or provolone for taste, and is formed by a conventional processed cheese process followed by homogenisation. It is obtainable from MILKANA NEU-ULM, Germany.

In one embodiment of the present invention, the au gratin sauce is suitable for adding to a cooked host food. Such a sauce may comprise 20–40 wt % cheese, with at least 50% of the total cheese content preferably being NMS cheese. As a result of such high levels of cheese, CMC (carboxymethylcellulose) is preferably present. CMC, together with added xanthan, maintain the desired viscosity of the sauce over a wide temperature range.

The NMS cheese contributes to the excellent browning of the au gratin sauce, when the sauce is heated under a grill, for example. Other contributory factors may include the presence of other milk proteins and hydrocolloids, the viscosity of the sauce and the incorporation of air during the preparation of the sauce. It is desirable that, during the browning action, no even skin is formed on the surface of the sauce, since such a surface has a tendency to burn. NMS cheese contains very small non-dissolved particles, so the surface of the sauce is constantly disrupted and the browning is confined to a plurality of small areas (ie it is uneven). As a result, no even skin is formed which would be evenly browned and lead to rapid burning.

The total protein content of the sauce which is suitable for adding to a cooked host food is preferably 8 to 9 wt %. The browning agent may include from 1.0–2.5 wt % lactose and/or whey protein concentrate, eg 1.75 wt % concentrate comprising 80 wt % protein, or 2.7 wt % concentrate comprising a mixture of 35 wt % and 80 wt % protein. The sauce may also contain saccharose, eg 1.0 wt %.

The au gratin sauce, whether added to a raw or a cooked host food, preferably has a high viscosity so that it sticks to the host food, thereby cooking the food (if applicable) and enabling browning: the Bostwick viscosity values for the sauces are preferably 1 to 20 cms/30 secs, more preferably 3 to 13 cms/secs, and most preferred 5 to 10 cms/secs. The range of temperatures in which the desired viscosity is maintained is preferably 4°–110° C., and more preferably 65°–90° C.

Lysophospholipoprotein is the result of the enzymatic hydrolysis of the lecithin/protein complex in the egg yolk using the enzyme phospholipase A2. Lysophospholipoprotein is known as a stabilizer for use in dressings and sauces, but none of these is suited for cooking au gratin dishes. The preparation of lysophospholipoprotein is described in e.g. British patent 1525929. A common way to employ the lysophospholipoprotein is by incorporating into the sauce egg yolk which has been subjected to phospholipase A2 activity. A suitable amount is 1–10 wt. %, preferably 1.5–4.5 wt. % and more preferably 2.0–3.5 wt. % of converted liquid egg yolk. The converted egg yolk may be added as such or it may be added in spray dried form as described in EP 0 426 211.

The lysophospholipoprotein has to be present in an amount of, preferably 150–1000 ppm and more preferably 300–500 ppm lysophospholipoprotein calculated on liquid egg yolk or, calculated on the ready sauce, 0.5–4.0 ppm, preferably 1.0–3.0 ppm.

The addition of lysophospholipoprotein results in an emulsion which is stable at the high temperatures required to sterilise the au gratin sauce, and which is also stable during cooking by the consumer.

If desired, the sauce is flavoured by adding proper flavourings, spices, seasonings and herbs and is enriched with visually distinguishable food particles, having a size of 0.5–7 mm, such as e.g. 3–6 mm pieces of bacon and onions.

The pH of the sauce of the invention is at least 5.0, preferably 5.5, most preferably 6.0.

In one embodiment, the preparation of the emulsion according to the invention comprises the steps of:

(a) mixing the ingredients comprising edible fat, caseinate, browning agent, lysophospholipoprotein, optional ingredients and water in any order;

(b) processing the pre-mix in standard dressing equipment, comprising a colloid mill or a homogenizer;

(c) sterilising and packing or packing and then sterilizing the obtained emulsion.

Preferably, in step (a) the water phase is prepared first with all ingredients except the fat and finally the fat is incorporated.

In another embodiment, steps (b) and (c) are reversed to the extent that the sterilisation is carried out prior to the homogenisation.

TetraPacks™ and cans are suitable containers, but glass jars are preferred. The containers are filled preferably with the sterilized product on a line under either UHT or HTST aseptic conditions. Alternatively the sauce can be sterilized in the package, e.g. by retorting at 115° C. for 70 minutes, using a static or rotating retort. Even after long sterilization times no damage to the sauce has been observed.

In one aspect, the invention is a food product, preferably being in an uncooked, fresh and raw state, covered with the au gratin sauce according to the invention. The host food may be e.g. potatoes, pasta, rice, vegetables or fish. The host food is covered, preferably with an equal amount of au gratin sauce.

In this respect, the food product is cooked by exposing the food to or placing it in a heat source in such a way that the food is fully cooked and the sauce layer turns golden brown. Since the sauce emulsion is temperature stable it may stand an extended cooking period, suitably for 20–90 minutes, preferably for 30–60 minutes. If not eaten immediately, the cooked food may be preserved, e.g. by freezing it.

In another aspect of the invention, the au gratin sauce is applied to a cooked host food and then heated to achieve rapid browning, preferably for 1 to 5 minutes.

Heating equipment comprises gas ovens, convection ovens, electric ovens, grills and microwave ovens with a browning element. Suitable oven temperatures are 100°–250° C., preferably 160°–200° C. When the sauce is added to a raw host food, particularly preferred cooking conditions are 40 minutes at 160° C. in a convection oven and 55 minutes at 195° C. in a common (electrical or gas oven.

The present invention provides a stable emulsion, which is also microbiologically stable and heat stable, for use as a high temperature cooking sauce having excellent organoleptical properties, comprising a mild, creamy and cheesy taste. The host food of the au gratin dish may be raw or partially- or fully-cooked.

At wish, the sauce is either poured on top of the food or soaked through it.

Cooking with the sauce delivers a gorgeous au gratin effect and appears to be free from undesired side effects such as, not fully cooked host food, or broken emulsions.

Embodiments of the invention will now be described, by way of example only:

EXAMPLE 1

Preparation of a bacon and onion sauce

1. Collect the ingredients from TABLE I.
2. Add skimmed milk powder, cheese, lactic acid and flavours and spices to part of the water; mix well until fully dissolved.
3. Add oil and stir vigorously to make a standard emulsion.
4. Mix the remaining water and starch, then add the onion and bacon pieces. Pasteurise the mixture at 85° C. for 5 minutes to fully swell/cook the starch. Add the mixture to the above emulsion.

Fill into glass jars. Sterilise the sauce in pack by retorting; it is then free of spore-forming micro-organisms.

TABLE I

| Ingredients | wt. % |
| --- | --- |
| Soybean oil | 30 |
| Egg yolk* | 2.5 |
| Natural Parmesan cheese | 3.5 |
| Skimmed milk powder | 3.5 |
| Modified corn starch | 2 |
| About 5 mm pieces of bacon | 6 |
| About 5 mm pieces of onion | 6 |
| Lactic acid | As required to balance flavour |
| Spices/flavours | As required to balance flavour |
| Water | Balance to 100% |

*egg yolk stabilized by a treatment with phospholipase A2.

EXAMPLE 2

Another au gratin sauce (ie not containing bacon & onion) suitable for cooking a raw host food comprises:

| | |
|---|---|
| sugars (wt %): fructose | 0.04 |
| sucrose | 0.12 |
| glucose | <0.01 |
| lactose | <0.01 |
| total carbohydrate (wt %) | 2.90 |
| fat (wt %) | 25.20 |
| protein (wt %) | 2.20 |

EXAMPLE 3

Cooking an au gratin potato dish 300 gram of raw potatoes are washed, optionally peeled, and cutted in slices being 1–10 mm, preferably about 5 mm thick.

Pre-heat the gas oven to 190° C. (convection oven 160° C.). Place the sliced raw potatoes in an oven-proof dish, e.g. a ceramic casserole and cover these with 300 g of the sauce of example 1.

Place the dish in the oven and cook for 40–45 minutes or until the top layer has turned golden brown.

In a 700 W microwave oven (with browning element) the dish should be cooked 15 minutes with HIGH power. When the dish is cooked after 20 minutes, remove the cover and turn on browning element for 5 minutes or until the sauce has turned golden brown.

If partially or fully cooked potatoes are used, such as "left overs", the sauce can be browned in gas, convection or microwave (with browning element) for 5–15 minutes (depending on type of oven).

EXAMPLES 4–6

The compositions of au gratin sauces suitable for fully cooking host foods in accordance with the cooking method of Example 3, are shown in Table II. These sauces can be prepared by generally following the method of Example 1.

TABLE II

| Ingredients | eg 4/wt % | eg 5/wt % | eg 6/wt % |
|---|---|---|---|
| Rape Oil | 27.9 | 24.1 | 24.1 |
| Cheese | 5.0 | 1.9 | 0.5 |
| Egg yolk* | 2.9 | 2.5 | 2.5 |
| Modified starch | 2.0 | 1.4 | 2.2 |
| Smoked pork bellies | — | 6.0 | — |
| Onion | — | 4.1 | 3.2 |
| Bacon | — | 1.0 | — |
| Lactose | — | — | 1.5 |
| Spices/flavours | as required to balance flavour | | |
| Water | balance to 100% | | |
| Edible fat | 29.0% | 28.0% | 26.0% |
| Cheese caseinate | 1.0% | 0.4% | 0.1% |
| Browning agent** | 0.3% | 0.3% | 1.5% |
| Lysophospholipo protein | 2.9% | 2.5% | 2.5% |

*egg yolk stabilised by treatment with phospholipase A2
**browning agent, not comprising cheese caseinates.

EXAMPLES 7–8

Preparation of an au gratin sauce
1. Collect the ingredients from one or other list in Table III.
2. Add NMS cheese to a hot water phase at 70° C. Stir vigorously to beat in air.
3. At 70° C., add all the other ingredients, but adding the vegetable fat last.
4. Stir the mixture at 70° C.
5. Sterilise the mixture at 140° C.
6. Cool the mixture to 60°–70° C.
7. Homogenise the mixture at 200–400 bar.
8. Cool the mixture.
9. Fill glass jars with the mixture aseptically at 30° C.

The resultant sauce is stable at 70° C. for 4 hours and is ambient stable for 26 weeks.

The sauce can be applied to a cooked host food, such as vegetables, and cooked in the oven or under the grill in only 2.5 minutes to give a good, glossy, golden brown au gratin coating. The NMS cheese gives the glossy surface to the golden brown au gratin sauce.

At 5°–10° C. this sauce has a Bostwick viscosity value of approx 6.5 cms/30secs and can therefore be used as a cold dip.

The sauces of examples 7 and 8 are suitable for adding to a cooked host food. The sauce of example 7 comprises:

23 wt % edible fat 6 wt % cheese caseinate 37 wt % browning agent, not comprising cheese caseinate
It has a pH of 5.6.

The sauce of example 8 comprises:

37 wt % edible fat 3 wt % cheese caseinate 5.8 wt % browning agent, not: comprising cheese caseinate

TABLE III

| Ingredients | Eg. 7/wt % | Eg. 8/wt % |
|---|---|---|
| NMS cheese* | 33.3 | 26.2 |
| Skimmed milk powder | 1.0 | 1.0 |
| Whey protein concentrate | 2.7 | 2.8 |
| Vegetable fat | 8.0 | 27.0 |
| CMC | 0.5 | 0.3 |
| Xanthan | 0.3 | 0.1 |
| Water | 53.2 | 37.6 |
| Egg yolk | 1.0 | 3.0 |
| Lactose | — | 2.0 |

*see TABLE IV for the composition of the NMS cheese used.

TABLE IV

| Ingredients | Eg. 7/wt % | Eg 8/wt % |
|---|---|---|
| Gouda | 36.9 | 23.0 |
| Whey protein concentrate | 4.0 | 2.75 |
| UF cheese | 36.0 | 36.0 |
| Parmesan | 6.0 | 6.0 |
| Cooking salt | 2.4 | 2.4 |
| Water | 14.7 | 30.5 |

We claim:

1. A sterile, packed food emulsion suitable for fully cooking a host food or adding to cooked food and for imparting a golden brown au gratin coating upon cooking, and comprising:

water;

from 10 to 65 wt % edible fat;

from 0.05 to 10.00 wt % caseinate; and from 0.1 to 10.0 wt % browning agent, which is chosen from a group consisting of carbohydrates, proteins and mixtures thereof; wherein the emulsion has a pH of at least 5.0 and further comprises at least 0.5 ppm lysophospholipoprotein as an emulsifier, and the emulsion does not contain 20–100 wt % cream.

2. Food emulsion according to claim 1, wherein the caseinate is cheese caseinate, and the browning agent does not comprise cheese caseinates.

3. Food emulsion according to claim 1, comprising 20–40 wt % edible fat.

4. Food emulsion according to claim 1, comprising 0.1–5 wt % browning agent.

5. Food emulsion according to claim 1, wherein the proteins of the browning agent are dairy proteins not being caseinate.

6. Food emulsion according to claim 1, characterised in that the browning agent comprises skimmed milk powder.

7. Food emulsion according to claim 1, characterised in that it has a Bostwick viscosity value of from 1 to 20 cms/30 secs.

8. Food emulsion according claim 1, characterized in that the emulsion contains from 0.5 to 4.0 ppm, lysophospholipoprotein calculated on the emulsion.

9. Food emulsion according to claim 1, characterized in that the lysophospholipoprotein is added in the form of from 1.0 to 10.0 wt %, of egg yolk which has been converted by phospholipase A2.

10. Food emulsion according to claim 1 for adding to cooked food, comprising 20–40 wt % cheese.

11. Food emulsion according to claim 10, wherein at least 50% of the cheese is Non-Melting-Salt cheese.

12. Food emulsion according to claim 1 characterized in that the emulsion is mixed with one or more ingredients selected from a group consisting of spices, flavours, herbs and visually distinguishable particles having a size of from 0.5 to 7.0 mm.

13. Food emulsion according to claim 1, characterized in that the emulsion contains modified starch, in an amount of from 1 to 3 wt. % of the emulsion.

14. Food emulsion according to claim 3, comprising 20–35 wt. % edible fat.

15. Food emulsion according to claim 8, comprising 1.0 to 3.0 ppm lysophospholipoprotein calculated on the emulsion.

16. Food emulsion according to claim 9, characterized in that the lysophospholipoprotein is added in the form of from 1.5 to 4.5 wt. % of egg yolk which has been converted by phospholipase A2.

17. Food emulsion according to claim, 16, characterized in that the lysophospholipoprotein is added in the form of 2.0 to 3.5 wt. % egg yolk which has been converted by phospholipase A2.

* * * * *